United States Patent
McLeod et al.

(10) Patent No.: US 6,560,093 B1
(45) Date of Patent: May 6, 2003

(54) CARREL COMPUTER TERMINAL

(75) Inventors: David G. McLeod, Atlanta, GA (US); Kevin L. Kamphuis, Round Rock, TX (US)

(73) Assignee: NCR Corporation, Dayton, OH (US)

( * ) Notice: Subject to any disclaimer, the term of this patent is extended or adjusted under 35 U.S.C. 154(b) by 39 days.

(21) Appl. No.: 09/896,314

(22) Filed: Jun. 29, 2001

(51) Int. Cl.⁷ .............................. G06F 1/16; H05K 5/00
(52) U.S. Cl. ..................... 361/681; 361/680; 361/825; 312/223.2; 312/223.3; 312/270.2
(58) Field of Search ................. 312/325, 327, 312/328, 223.1, 223.3; 361/724–727, 681, 682

(56) References Cited

U.S. PATENT DOCUMENTS

| | | | |
|---|---|---|---|
| 4,832,419 A | * | 5/1989 | Mitchell et al. ............ 248/918 |
| 5,107,402 A | * | 4/1992 | Malgouires ................. 16/307 |
| 5,711,231 A | | 1/1998 | Couvrette et al. |
| 5,740,744 A | | 4/1998 | Nashirozawa et al. |
| 5,941,615 A | * | 8/1999 | Ito et al. .................. 312/223.2 |
| 6,010,065 A | | 1/2000 | Ramachandran et al. |
| 6,125,028 A | * | 9/2000 | Matsumoto ................. 248/920 |
| 6,201,690 B1 | * | 3/2001 | Moore et al. ............ 312/223.1 |
| 6,359,775 B1 | * | 3/2002 | Revis ........................ 248/916 |

* cited by examiner

Primary Examiner—Darren Schuberg
Assistant Examiner—Anthony Q. Edwards
(74) Attorney, Agent, or Firm—Francis L. Conte

(57) ABSTRACT

A computer terminal includes a cabinet having a front portal, and computer hardware mounted therein. A monitor covers the portal and is operatively joined to the hardware by an electrical cable. The monitor is mounted to the portal as a door which may be tilted open for providing convenient access to the computer hardware found therein.

22 Claims, 6 Drawing Sheets

CARREL COMPUTER TERMINAL

BACKGROUND OF THE INVENTION

The present invention relates generally to digital computers, and, more specifically, to integrated computer terminals.

The continuing development of personal computers (PCs) has led to a substantial reduction in size thereof and increase in computational power. A typical PC includes a self-contained computer cabinet containing all the hardware therein which is joined by electrical cables to a separate monitor and keyboard, as well as to a printer and the internet through a cooperating modem.

The typical laptop or notebook computer integrates into one cabinet the computer hardware, monitor, and keyboard, for example, which may be attached to a separate printer and the internet if desired.

PCs are commonly found in homes, businesses, and public arenas like airports, colleges, and libraries for various personal and business uses. And, such computers are typically joined to the internet for the wide availability of services provided thereby.

In public arenas and business applications for computer terminals, high usage thereof is expected, along with security thereof. And, limited space is available for each computer terminal when used in specific public and business applications.

The resulting high usage of the computer terminals requires periodic maintenance of the various operating components thereof. Access to the interior of the computer terminal is therefore required, but is typically made difficult when computer terminals are located in confined spaces typically found in business and public arenas.

Accordingly, it is desired to provide an improved integrated computer terminal which is readily accessible for service maintenance thereof.

BRIEF SUMMARY OF THE INVENTION

A computer terminal includes a cabinet having a front portal, and computer hardware mounted therein. A monitor covers the portal and is operatively joined to the hardware by an electrical cable. The monitor is mounted to the portal as a door which may be tilted open for providing convenient access to the computer hardware found therein.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
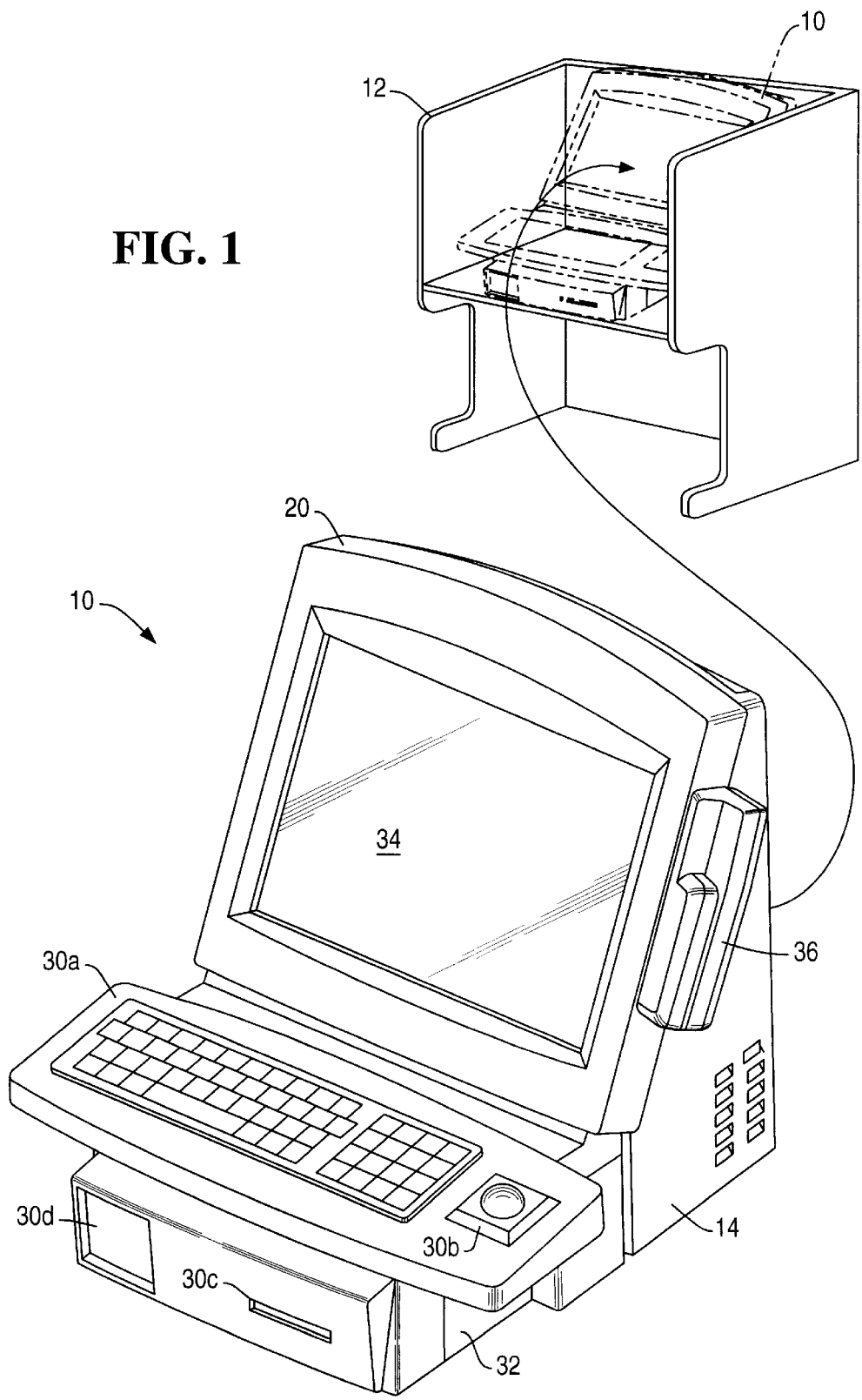
FIG. 1 is an isometric view of an integrated computer terminal configured for being mounted in a carrel in accordance with an exemplary embodiment of the present invention.

Illustrated in FIG. 1 is an integrated computer terminal 10 configured for being mounted in a small cubical or carrel 12 in accordance with an exemplary embodiment of the present invention. The carrel may take any suitable form such as a stand-alone desk having a table top surrounded on both sides and the back by suitable sidewalls.

The computer terminal may be configured for any desired application from personal home use, business use, or public access in various business or public arenas. For example, the computer terminal may be configured as a sales terminal for business applications, or as a web kiosk for use by the public to access the internet.

Figure 2:
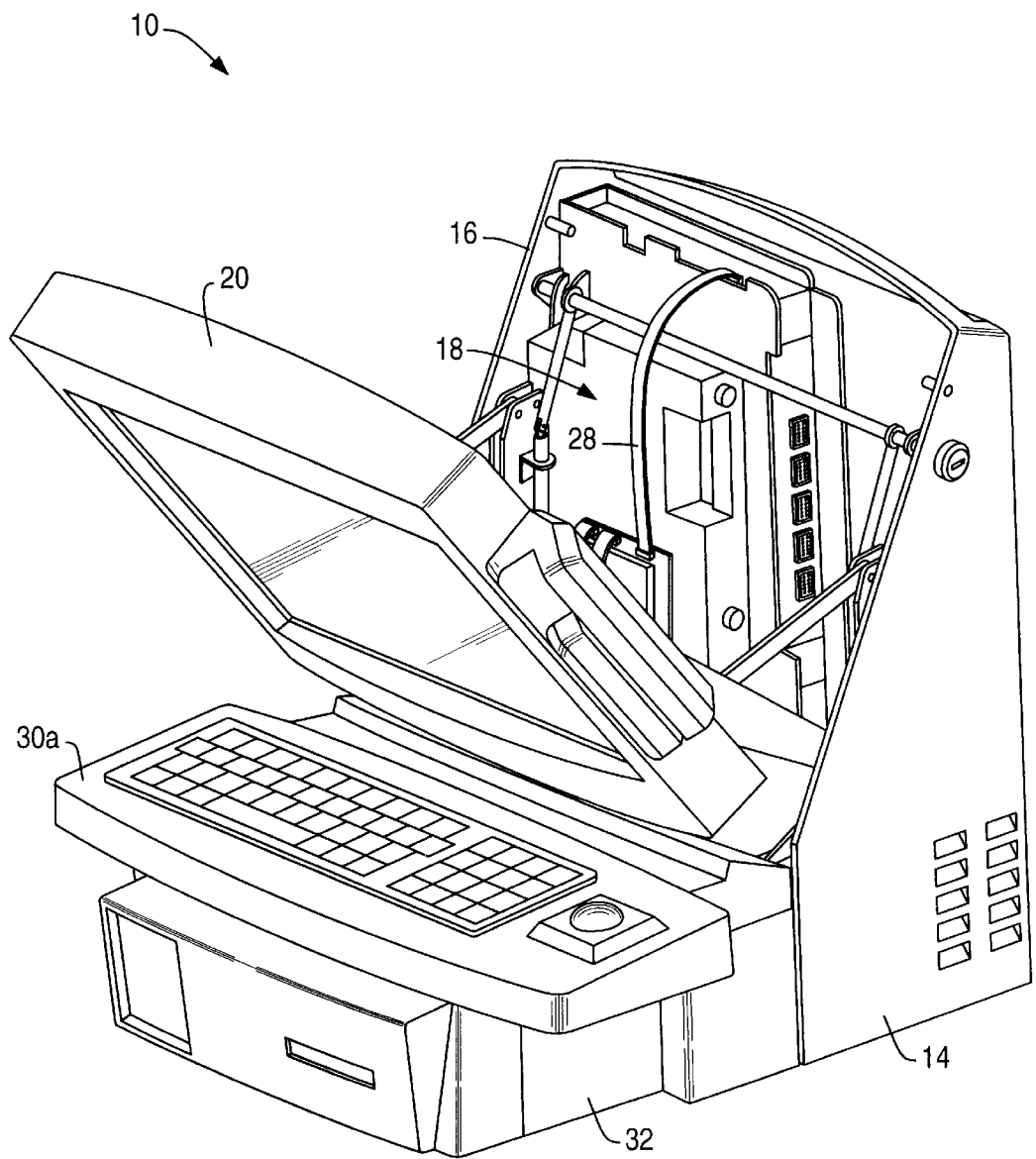
FIG. 2 is an isometric view of the computer terminal illustrated in FIG. 1 with the front monitor thereof being partially open for accessing hardware inside the computer cabinet.

As shown in FIGS. 1 and 2, the computer terminal includes an enclosure or cabinet 14 to which the various components of the computer may be attached. The cabinet may be formed of thin metal to provide a box housing sized to fit within the carrel 12 for being securely mounted therein by suitable fasteners. The cabinet is fixedly mounted in the carrel and is thusly inaccessible from all sides thereof except the front and top which correspond with the open front and top of the carrel.

Figure 3:
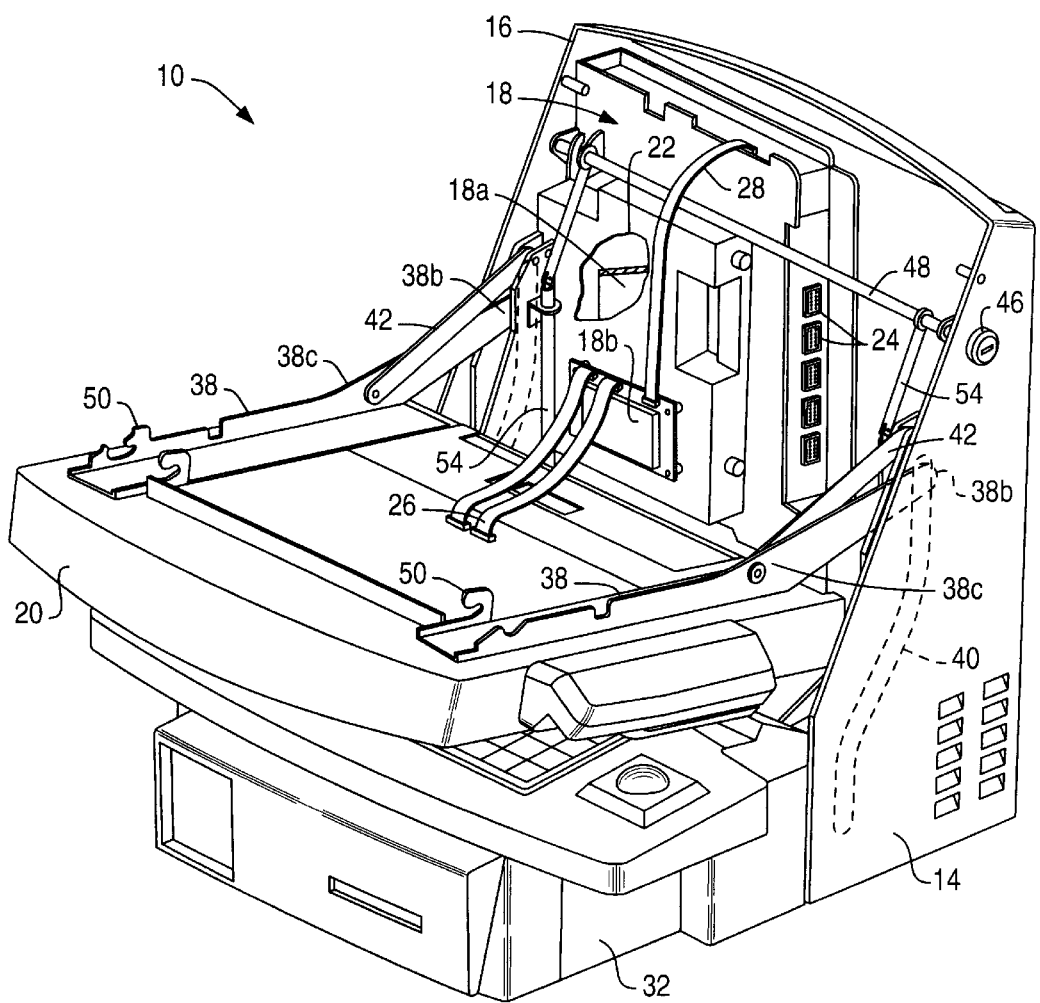
FIG. 3 is an isometric view of the computer terminal illustrated in FIG. 1 with the monitor being tilted fully open into a generally horizontal position.

As shown in FIGS. 2 and 3, the cabinet is preferably closed along its two sides, back, and bottom for corresponding with the four walls of the carrel in which it is mounted in FIG. 1. The cabinet includes a front entrance or portal 16 which faces forwardly toward the user, with the back of the cabinet facing away from the user and typically hidden inside the carrel.

The front portal of the cabinet permits ready access for a service technician to the various computer hardware 18 mounted inside the cabinet, preferably vertically along the inside of the back wall thereof.

As shown in FIGS. 1, 2, and 3 the terminal also includes a display screen or monitor 20 which not only displays visual information to the intended user but acts as a door which fully closes or covers the front portal of the cabinet. The monitor may have any conventional configuration such as a flat panel LCD display, with a generally rectangular configuration and substantially flat front and back sides.

The computer hardware contained in the cabinet will have any conventional form for providing the desired services to the intended user. For example, the computer hardware shown in FIG. 3 includes the typical motherboard having a central processing unit (CPU) 18a which controls all functions of the computer using conventional software. The hardware is preferably mounted vertically along the back side of the cabinet and is preferably covered by an electromagnetic shield 22.

The hardware includes various electrical sockets 24 for providing external communication to various components as desired including a printer (not shown) or to a telephone interface for accessing the internet. And, the hardware includes a modem for internet access.

In order to operate the monitor 20, the computer hardware also includes a suitable display driver 18b, as best shown in FIG. 3, which is operatively joined to the monitor by one or more electrical cables 26 as required. The display driver is correspondingly joined to the hardware by another electrical cable 28 which permits easy replacement of the display driver. The various electrical cables are preferably flexible and flat and are sized in length as short as possible to reduce undesirable degradation of the electrical signals carried therethrough.

As illustrated in FIG. 1 the computer terminal also includes various computer peripherals, designated in general by the prefix 30, which are preferably mounted in a drawer 32 that extends horizontally forward from the front bottom of the cabinet below the monitor in a lower portion of the front portal.

The computer peripherals may include a standard keyboard 30a mounted horizontally atop the drawer and below the front of the monitor for convenient access. The keyboard may include a standard trackball 30b and, the keyboard and trackball are conventionally joined to the CPU through the operating hardware by corresponding electrical cables.

If desired, the keyboard my be omitted and a flat workshelf substituted therefor. The monitor 20 may then include a conventional touchscreen 34 mounted over the display screen thereof and operatively joined to the CPU. Or, the both the touchscreen and keyboard may be used in the same terminal if desired.

The peripherals contained in the drawer preferably also include a conventional electronic card reader 30c in which the typical smart card is inserted for providing secure access to the computer terminal. The card reader is conveniently located at the front of the drawer, and is also operatively joined to the CPU.

The monitor may also include a conventional magnetic card reader 36 as shown in FIG. 1 conveniently mounted to the upper right side of the monitor, and operatively joined to the CPU by an electrical cable specific thereto. Either or both of the two card readers 30c,36 may be used as desired.

For a typical sales terminal application, the computer terminal preferably also includes a barcode scanner 30d of any conventional configuration mounted inside the front of the drawer. The scanner includes a front facing window through which a laser scan line may be emitted for reading and decoding the typical barcode used for identification purposes. The barcode reader is operatively joined to the CPU by another electrical cable hidden inside the cabinet with the other electrical cables to the various peripherals.

Accordingly, the computer terminal illustrated in FIG. 1 may be configured with any desired functional capability for providing specific user functions. Either of the two card readers permit access to authorized users to various functions, such as sales transactions, internet access, and any of the myriad functions found useful to the targeted user.

When installed in the carrel illustrated in FIG. 1, the monitor 20 and peripheral drawer 32 directly face front to the user for ready access thereto. However, the sides, bottom, and back of the computer terminal are hidden within the adjoining walls of the carrel and thus provide no access to the computer cabinet itself or the operative components mounted therein.

Accordingly, the computer terminal illustrated initially in FIGS. 2 and 3 includes means in accordance with the present invention for tilting open the monitor 20 in the form of a door for providing convenient access to the internal components of the cabinet from the front portal 16 thereof. The opening means correspondingly mount the monitor to close the front portal while permitting opening thereof with preferably compound motion of the monitor, as opposed to simple one-axis pivoting movement thereof.

Figure 4:
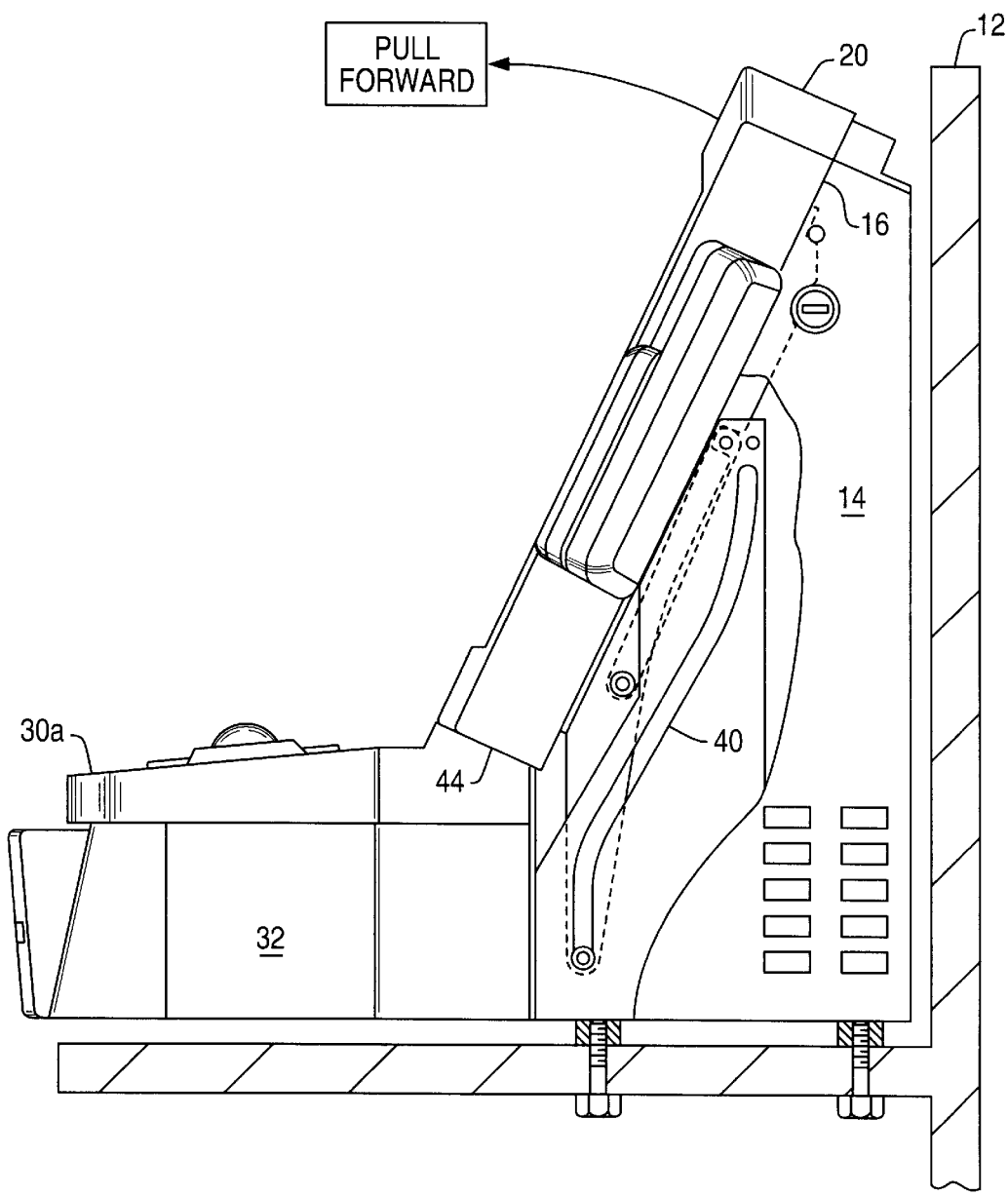
FIG. 4 is a partly sectional side elevational view of the carrel-mounted computer terminal of FIG. 1 with the monitor closed atop the cabinet portal.
Figure 5:
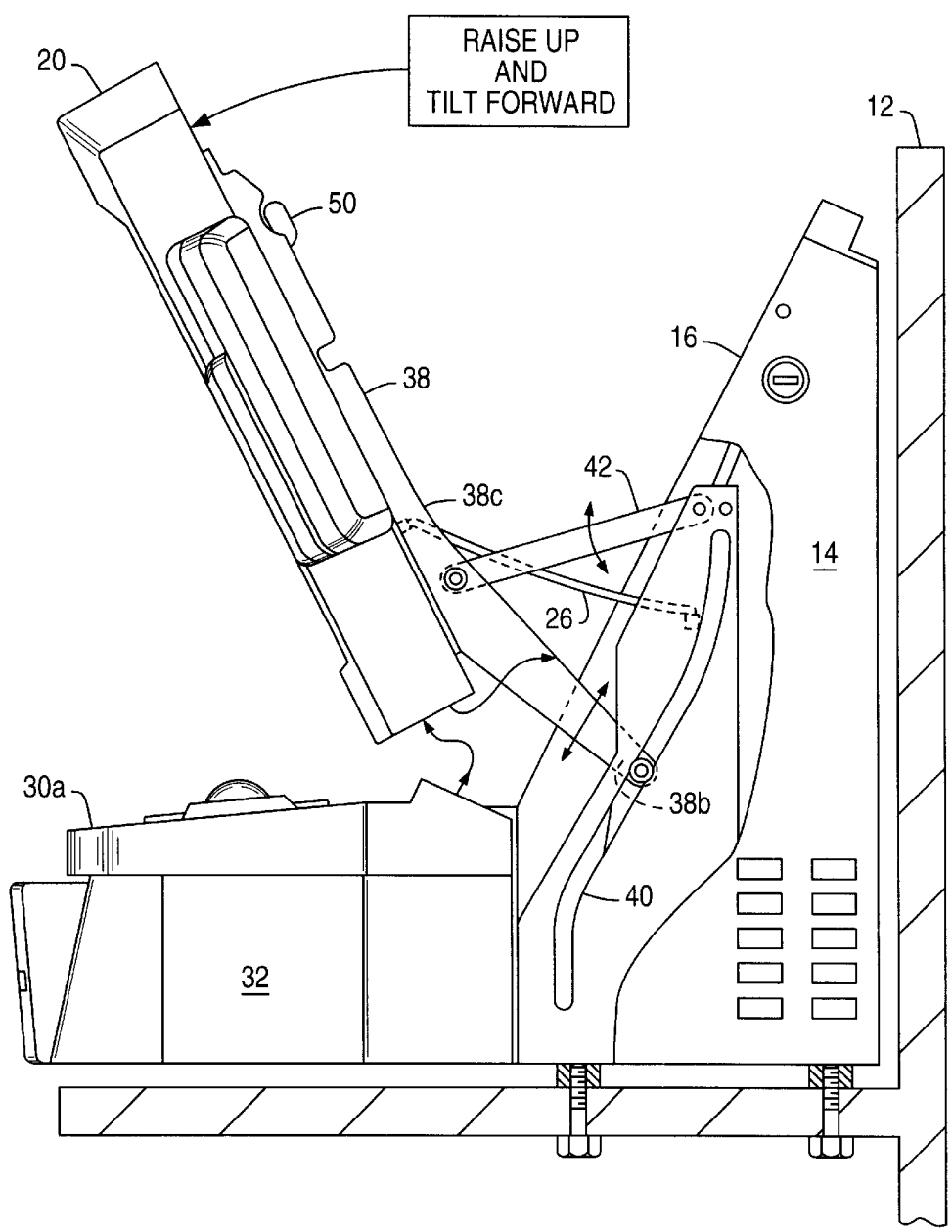
FIG. 5 is a side elevational view, like FIG. 4, with the monitor being pulled forward in a partly open position corresponding with FIG. 2.
Figure 6:
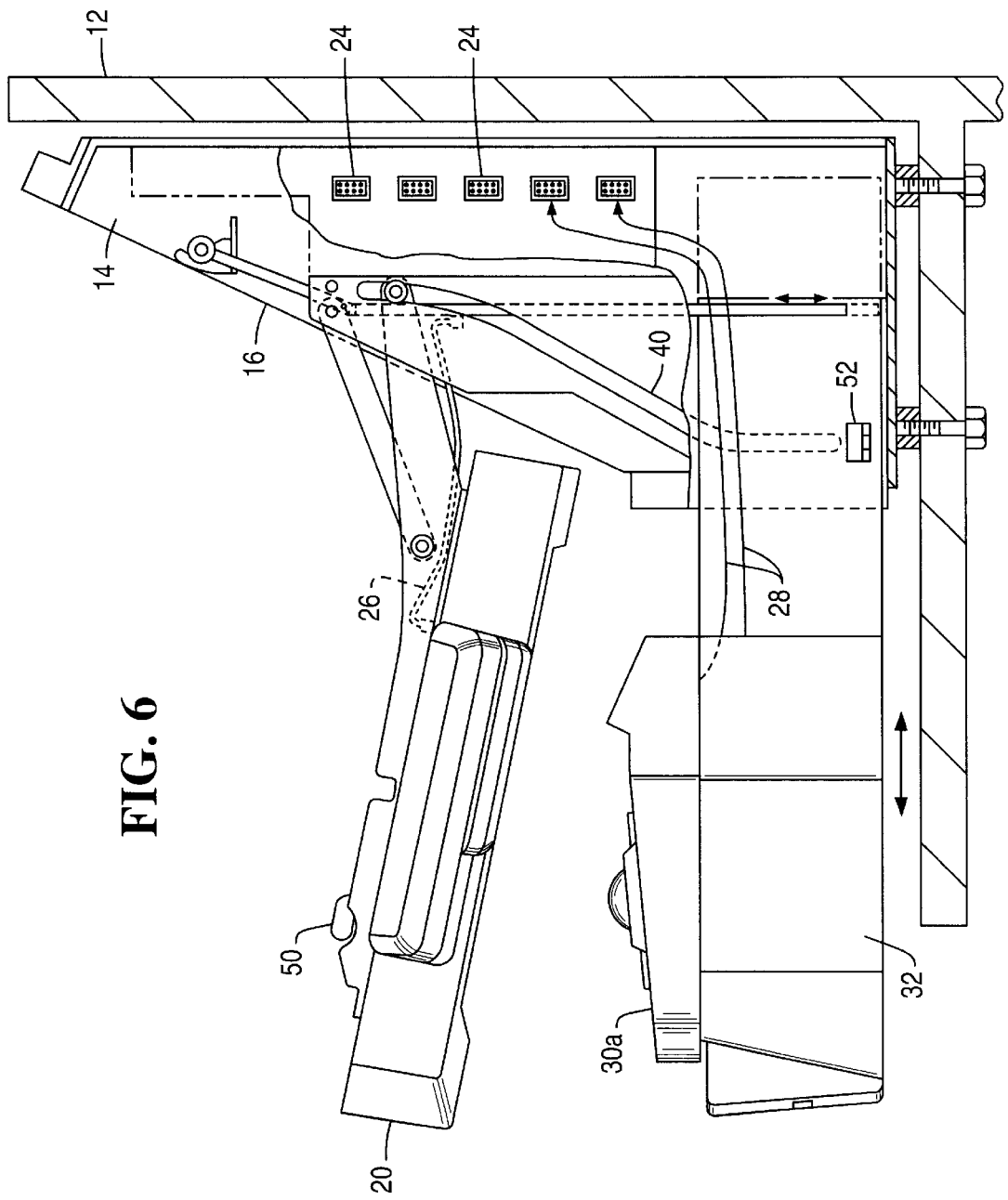
FIG. 6 is a side elevational view, like FIG. 4, with the monitor being substantially open, and corresponding with FIG. 3.

As shown in sequence in FIGS. 4–6, the computer terminal is readily serviced by the maintenance technician for gaining access into the cabinet by simply pulling forward the monitor 20 from the top thereof which then tilts the monitor counterclockwise in these figures toward a substantially horizontal position illustrated in FIG. 6 to open the front portal 16. As shown in corresponding FIG. 3, the projecting or deployed monitor provides substantially unobstructed front access to all the computer hardware mounted inside the cabinet. The various computer hardware is typically modular and may be conveniently disassembled as required for removing, repairing, or replacing the various components as necessary in a typical maintenance service operation.

The compound motion for opening the monitor 20 is preferably effected in accordance with an exemplary embodiment of the present invention, as illustrated initially in FIG. 3, by fixedly attaching the proximal ends of a pair of support brackets 38 to the back side of the monitor at opposite left and right sides thereof. The left and right brackets 38 are substantially identical in configuration in mirror image specific to the corresponding side of the monitor and extend downwardly below the bottom of the monitor to distal ends 38b, shown in additional detail in FIG. 5. The bracket distal ends extend inside the front portal and adjoin the left and right sides of the cabinet.

As shown in FIGS. 3 and 5, a pair of tracks 40 in the form of slots in metal sideplates are fixedly mounted inside the cabinet at opposite left and right sides of the front portal. As shown in FIG. 5, the bracket distal ends 38b are suitably mounted inside the corresponding tracks 40 for controlled sliding movement along the length thereof. This may be provided in any conventional manner such as by using a bronze bushing sized to the fit inside the track, with a circular shoulder at one end and pin mounted to the bracket distal end for rotary movement relative thereto.

As shown in FIGS. 3 and 5, a pair of straight metal links 42 are disposed on opposite left and right sides of the front portal. The left and right links each have an inner end pivotally joined to corresponding sides of the cabinet adjacent the tracks, and opposite outer ends pivotally joined to respective ones of the brackets 38 at an intermediate point 38c. The two links control rotation of the monitor as it is opened to uncover the front portal as the distal ends of the brackets slide along the respective tracks.

The corresponding two-bar linkages effected by the bracket 38 and corresponding link 42 cooperating with the respective track 40 controls the compound tilting and translation movement of the monitor as it is deployed away from the front portal. The left and right linkage configurations are substantially identical to each other in mirror image for providing parallel movement of both the left and right sides of the monitor during deployment opening and during retraction closing atop the front portal.

Since the monitor 20 initially illustrated in FIG. 1 is mounted vertically directly atop the drawer 32 and keyboard 30a, compound motion of the monitor is desired for preventing interference with the keyboard which would otherwise prevent opening of the monitor. Accordingly, the tracks 40 as illustrated in FIG. 5 preferably extend vertically between the opposite bottom and top ends thereof from the bottom of the cabinet 14 upwardly to generally the mid-height of the front portal 16. Correspondingly, the inner ends of the links 42 are disposed near the top ends of the tracks. And, the links are sized in length to position the outer ends thereof within the vertical elevation of the tracks over the total open-to-close movement of the monitor.

In the preferred embodiment illustrated in FIGS. 1 and 4, the front portal 16 is inclined rearwardly atop the front drawer 32 at a suitable angle of about 30 degrees from the vertical. And, the monitor 20 is thusly slightly tilted rearwardly when closed atop the portal at the same 30 degree angle for conveniently facing the line-of-sight of the intended user.

The cosmetic bezels surrounding the monitor and keyboard as illustrated in FIG. 4 preferably adjoin each other at a tightly fitting flat rectangular joint 44 therebetween. The spacing in the joint may be from several to a few hundred mils in thickness to provide continuity between the monitor and keyboard and prevent the placement of any extraneous matter or debris thereat. The joint extends the full width of the keyboard along the drawer at the bottom of the monitor. And, the flat joint is inclined at about 30 degrees from the horizontal to correspond with the backward tilt of the monitor.

Accordingly, the monitor cannot simply pivot forward around a single-axis bottom pivot without contacting the surrounding drawer bezel.

The tilting linkage is therefore configured for both raising upwardly the bottom of the monitor at the joint 44 and then tilting forwardly the top of the monitor to permit unobstructed opening of the monitor without interference from the keyboard or drawer bezel.

As shown in FIGS. 4 and 5, the tracks 40 begin near the base of the cabinet, and are substantially vertical adjacent the bottom ends thereof for first raising the monitor upwardly as the bracket distal ends slide vertically upwardly in the tracks while the monitor is pulled forward.

The mounting linkage is also effective for translating the monitor rearwardly at the front portal as the monitor is initially pulled forward. This is effected by inclining rearwardly the center portions of the two tracks 40. The tracks thus jog from primarily only vertical orientation at their bottom ends to a rearward inclination of about 30 degrees from the vertical which matches the backward inclination of the front portal.

As shown in FIG. 5, the tracks 40 are preferably substantially vertical adjacent the top ends thereof near the link inner ends. And, the brackets 38 are sized in length between the intermediate points 38c and corresponding distal ends 38b for being slightly greater than the corresponding length of the two links 42 between their two opposite pivot ends.

In this way, the two links 42 pivotally support the corresponding brackets 38 as shown in FIG. 5 during opening movement of the monitor and permit the bracket distal ends to slide vertically upwardly and rearwardly along the corresponding tracks 40 until they reach the upper ends thereof as illustrated in FIG. 6. In the substantially fully open position illustrated in FIG. 6, the monitor 20 is disposed generally horizontally atop the keyboard and drawer, with a slight inclination, for providing unobstructed access inside the front portal 16 as additionally illustrated in FIG. 3.

The linkage means defined by the brackets 38, tracks 40, and links 42, as illustrated in FIGS. 5 and 6 for example, permit controlled pivotal movement of the monitor as it is pulled away from the front portal, with the monitor initially rising slightly to clear the flat joint 44 illustrated in FIG. 4, and then permitting the monitor to be supported in the horizontal open position illustrated in FIG. 6.

The rearward inclination of the tracks 40 causes the monitor to translate rearwardly toward the back of the cabinet as it is pivoted open for minimizing the required length of the monitor cable 26. As indicated above, cable length should be minimized for minimizing signal degradation. The compound motion effected by the linkage means illustrated in FIG. 5 permits minimal extension of the cable between the monitor and the display driver at the mid-open position illustrated, with additional slack introduced in the cable in the near fully-open position of the monitor illustrated in FIG. 6.

In this way, the monitor cable may be folded in two legs when the monitor is closed atop the front portal, with the cable extending in position as the monitor is pulled forward as shown in FIG. 5 and then slightly slacking upon reaching the open position of the monitor illustrated in FIG. 6.

The kinematic motion of the monitor as it is opened and closed atop the cabinet is controlled by the length of the links and brackets between the respective pivoting points thereof, the configuration of the guiding track 40, and the location of the link inner ends which is preferably near the top end of the corresponding tracks 40. These parameters may be changed as desired for modifying the compound rotational and translational movement of the monitor as it is opened and closed.

A particular advantage of the inclined track illustrated in FIGS. 5 and 6 is that after the monitor passes the vertical position thereof and is further pulled forward, the weight of the monitor itself may be used for completing deployment of the monitor away from the front portal. And, in FIG. 6 the weight of the monitor maintains the monitor in the fully deployed position permitting unobstructed access inside the cabinet portal.

As shown in FIG. 6, the drawer 32 is preferably removable from the cabinet by being suitably slidingly mounted in a slot at the bottom of the cabinet for being withdrawn therefrom by pulling. The drawer may be simply mounted on plastic or Teflon pads for reducing friction, and may be partly or fully withdrawn from the cabinet. As shown in FIG. 6, the computer peripherals mounted in the drawer are mounted to corresponding sockets 24 of the controlling hardware by additional ones of the electrical cables 28.

In this way, all of the computer hardware mounted inside the cabinet is directly accessible from the open front portal 16, with the computer peripherals mounted inside the drawer being readily accessible by withdrawal of the drawer itself.

As shown in FIGS. 3 and 6, suitable means may be provided for locking closed the monitor 20 atop the front portal, as well as locking closed the drawer 32 retracted into the bottom of the cabinet.

The locking means include a common key lock 46 having an inner crank connected to a horizontal lock bar 48. The proximal ends of the two brackets 38 preferably include a pair of corresponding vertical hooks 50 disposed near the top of the backside of the monitor. The lock bar is suitably pivotally mounted inside the cabinet for engaging the vertical hooks when the monitor is retracted closed for locking the monitor over the front portal.

As shown in FIG. 6, the locking means also include a pair of horizontal hooks 52 mounted at the opposite left and right sides of the drawer. And, as shown in FIGS. 3 and 6, a corresponding pair of vertical lock bars 54 are suitably slidingly mounted inside the cabinet to engage the horizontal hooks for locking the drawer retracted closed inside the cabinet.

As shown in FIG. 3, the vertical lock bars 54 are each arranged in two articulated segments attached in series to the horizontal lock bar 48. As the horizontal lock bar 48 is rotated by turning the crankarm of the lock, the two vertical lock bars travel vertically therewith. In this way, the horizontal lock bar may be rotated vertically into engagement with the vertical hooks 50 while the vertical lock bars are translated vertically into the corresponding horizontal hooks 52.

The integrated computer terminal disclosed above is relatively compact and fixedly mounts therein all of its operating components. The monitor and peripheral drawer are mounted at the front of the cabinet and are readily accessible by both the intended user, as well as the service maintenance technician. The compact terminal may be mounted inside a correspondingly small carrel permitting primarily only front access to the terminal, and without requiring removal of the entire terminal from the carrel for servicing. The monitor and drawer may be simply unlocked when service is required, with the monitor being pulled forward for accessing the inside of the cabinet for service thereof.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which

We claim:

1. A computer terminal comprising:
   a cabinet having a front portal;
   computer hardware mounted inside said cabinet;
   a monitor covering said portal and operatively joined to said hardware by an electrical cable;
   left and right brackets fixedly attached to said monitor at opposite sides thereof and extending downwardly with distal ends adjoining said cabinet at said portal;
   left and right tracks fixedly mounted to said cabinet at opposite sides of said portal and inclined in part rearwardly into said cabinet, and correspondingly receiving said bracket distal ends for sliding movement thereal-ong; and
   left and right links each having an inner end pivotally joined to corresponding sides of said cabinet adjacent said tracks, and opposite outer ends pivotally joined to respective ones of said brackets at an intermediate point thereof for controlling rotation forwardly of the top of said monitor to uncover said portal as said bracket distal ends slide along said tracks.

2. A terminal according to claim 1 wherein:
   said tracks extend vertically between opposite bottom and top ends thereof from the bottom of said cabinet to said portal;
   said link inner ends are disposed near said track top ends; and
   said links are sized in length to position said outer ends thereof within the vertical elevation of said tracks.

3. A terminal according to claim 2 wherein said tracks are inclined rearwardly between said track opposite ends and kinematically cooperate with said brackets and links for effecting minimum extension of said cable at a partially open position of said monitor and additional slack in said cable near a fully open position of said monitor.

4. A terminal according to claim 2 wherein said tracks are substantially vertical adjacent said bottom ends thereof for first raising said monitor upwardly as said bracket distal ends slide therein, and then jog rearwardly with said inclination for tilting forward said monitor.

5. A terminal according to claim 4 wherein said tracks are substantially vertical adjacent said top ends thereof, and said brackets are sized in length between said intermediate points and distal ends thereof slightly greater than said link length for tilting forward said monitor generally horizontally when said distal ends reach said track top ends.

6. A terminal according to claim 4 further comprising a drawer of computer peripherals extending forwardly from said cabinet below said monitor, with a flat joint between the bottom of said monitor and top of said drawer.

7. A terminal according to claim 6 wherein said front portal is tilted rearwardly to incline said monitor rearwardly when closed, and said monitor and drawer joint are correspondingly tilted rearwardly.

8. A terminal according to claim 6 wherein:
   said computer hardware includes a central processing unit (CPU) and a cooperating display driver operatively joined to said monitor by said cable; and
   said computer peripherals include an electronic card reader accessible from said drawer, and operatively joined to said CPU.

9. A terminal according to claim 6 wherein said peripherals include a keyboard mounted atop said drawer, and operatively joined to said CPU.

10. A terminal according to claim 6 where said peripherals include a barcode scanner having a window in the front of said drawer, and operatively joined to said CPU.

11. A terminal according to claim 6 wherein said monitor includes a touchscreen operatively joined to said CPU.

12. A terminal according to claim 6 wherein said monitor includes a magnetic card reader fixedly joined thereto and operatively joined to said CPU.

13. A terminal according to claim 6 wherein said drawer is slidingly mounted in a slot at the bottom of said cabinet for being withdrawn therefrom.

14. A terminal according to claim 6 further comprising means for locking closed said monitor atop said portal and said drawer retracted in said cabinet.

15. A terminal according to claim 14 wherein said locking means include corresponding vertical hooks at proximal ends of said brackets disposed near the top of said monitor, and a horizontal lock bar pivotally mounted inside said cabinet for engaging said vertical hooks for locking closed said monitor atop said portal.

16. A terminal according to claim 15 wherein said locking means further include a horizontal hook disposed on said drawer, and a vertical lock bar slidingly mounted inside said cabinet for engaging said horizontal hook for locking retracted said drawer inside said cabinet.

17. A terminal according to claim 6 further comprising a carrel, with said cabinet being fixedly mounted therein and inaccessible from all sides except the front and top thereof.

18. A method of using said computer terminal according to claim 6 comprising:
   pulling forward said monitor from the top thereof; and
   tilting said monitor toward a horizontal position to open said front portal for access to said computer hardware inside said cabinet.

19. A method according to claim 18 further comprising raising said monitor bottom from said drawer during tilting thereof to open said flat joint vertically.

20. A computer terminal comprising:

a cabinet having a front portal;

computer hardware mounted inside said cabinet;

a monitor covering said portal and operatively joined to said hardware by an electrical cable; and means for tilting open said monitor from said cabinet with compound motion including tilting forward and concurrent translating rearward said monitor at said front portal.

21. A computer terminal comprising:

a cabinet having a front portal;

computer hardware mounted inside said cabinet;

a monitor covering said portal and operatively joined to said hardware by an electrical cable; and means for tilting open said monitor from said cabinet with compound motion including raising upwardly the bottom of said monitor and tilting forward the top of said monitor.

22. A terminal according to claim 21 wherein said tilting means are further effective for translating said monitor rearwardly at said front portal.

* * * * *